Jan. 15, 1935.  E. T. PETERSON  1,988,215
FLYING SHEAR
Filed Aug. 26, 1932    12 Sheets-Sheet 1

Fig.1.

Inventor
Edward T. Peterson
by
Attorneys.

Witnesses:

Jan. 15, 1935.  E. T. PETERSON  1,988,215
FLYING SHEAR
Filed Aug. 26, 1932    12 Sheets-Sheet 2

Jan. 15, 1935.   E. T. PETERSON   1,988,215
FLYING SHEAR
Filed Aug. 26, 1932   12 Sheets-Sheet 4

Fig. 4.

Jan. 15, 1935.　　　　E. T. PETERSON　　　　1,988,215
FLYING SHEAR
Filed Aug. 26, 1932　　　12 Sheets-Sheet 5

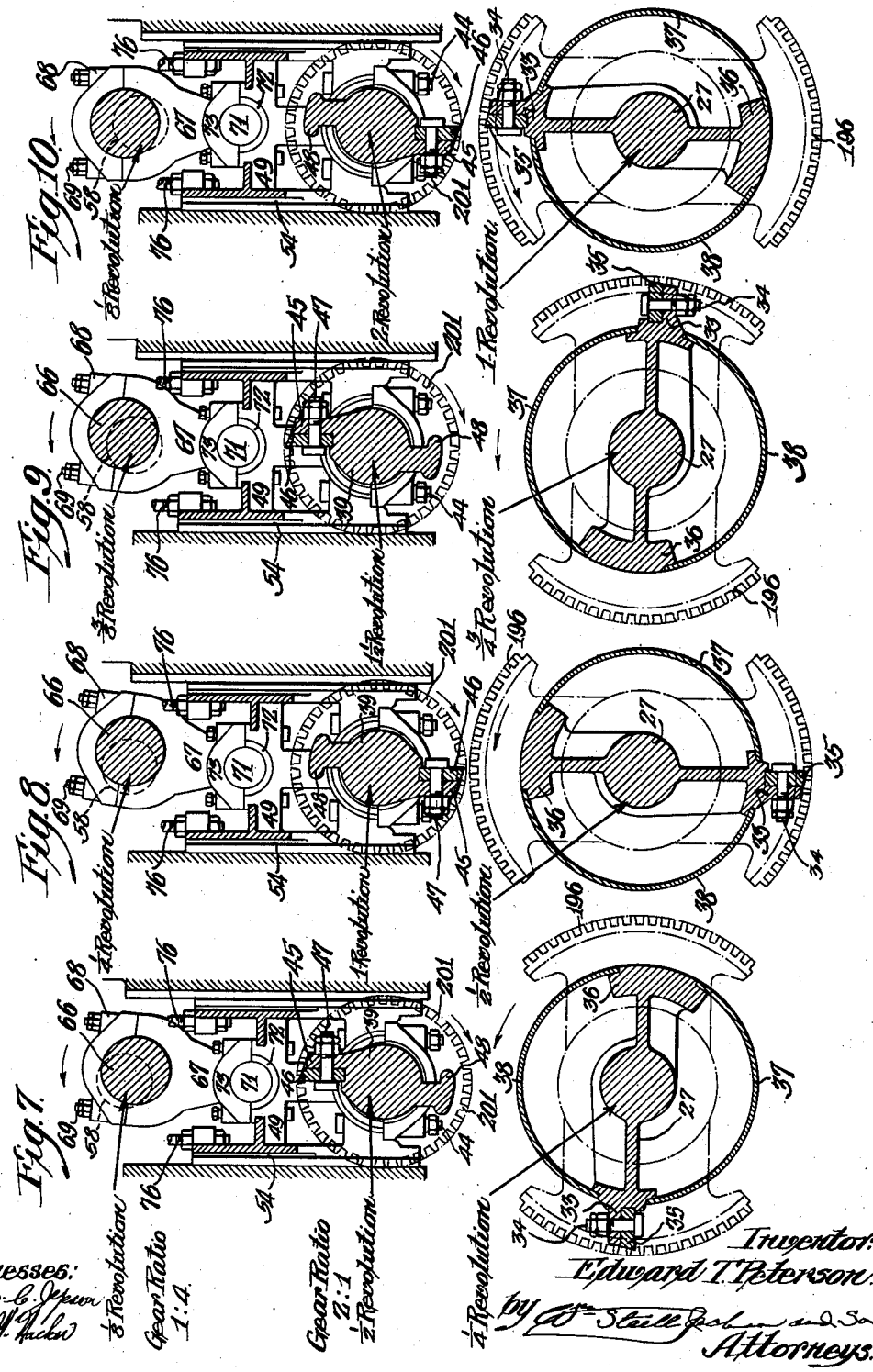

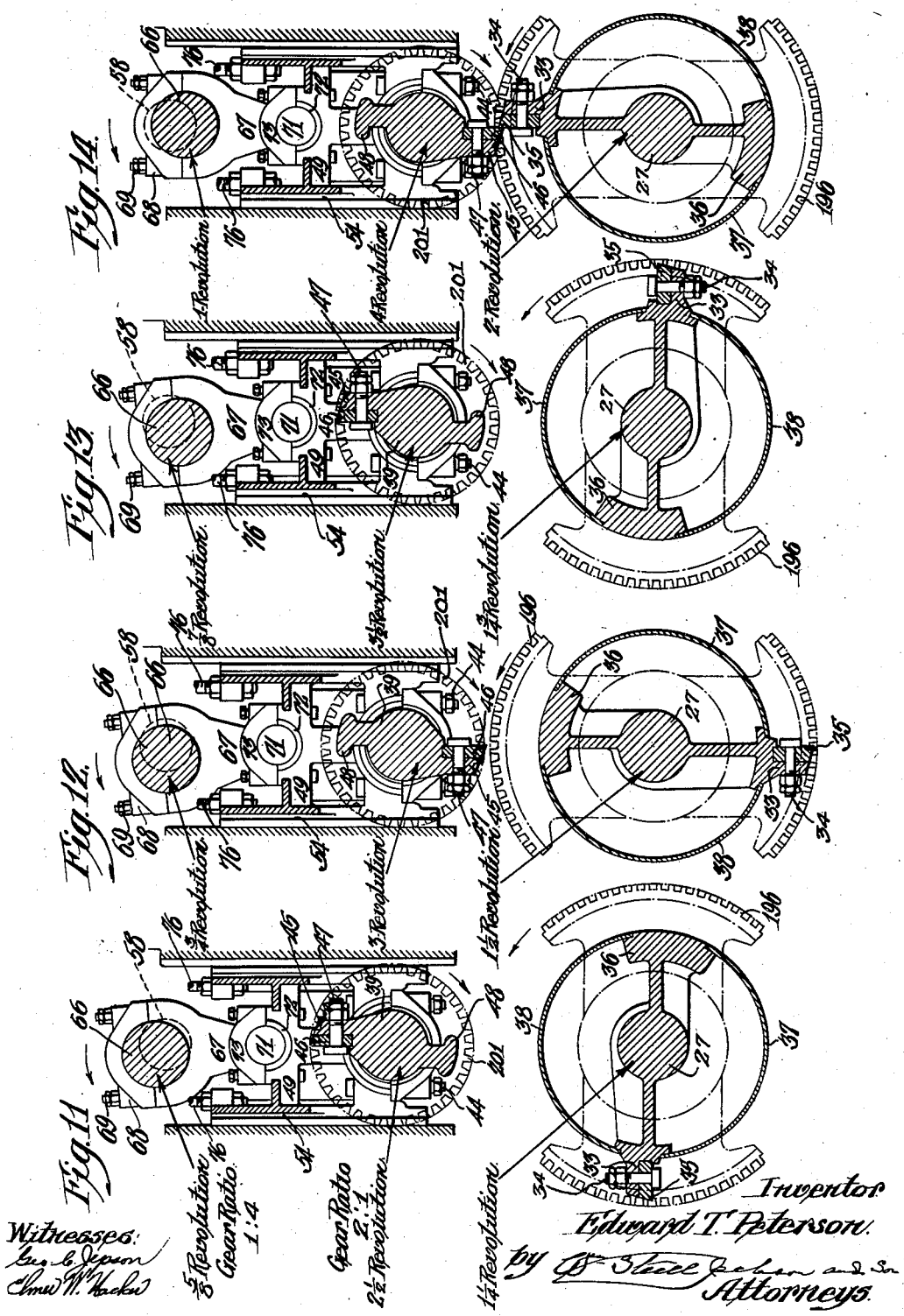

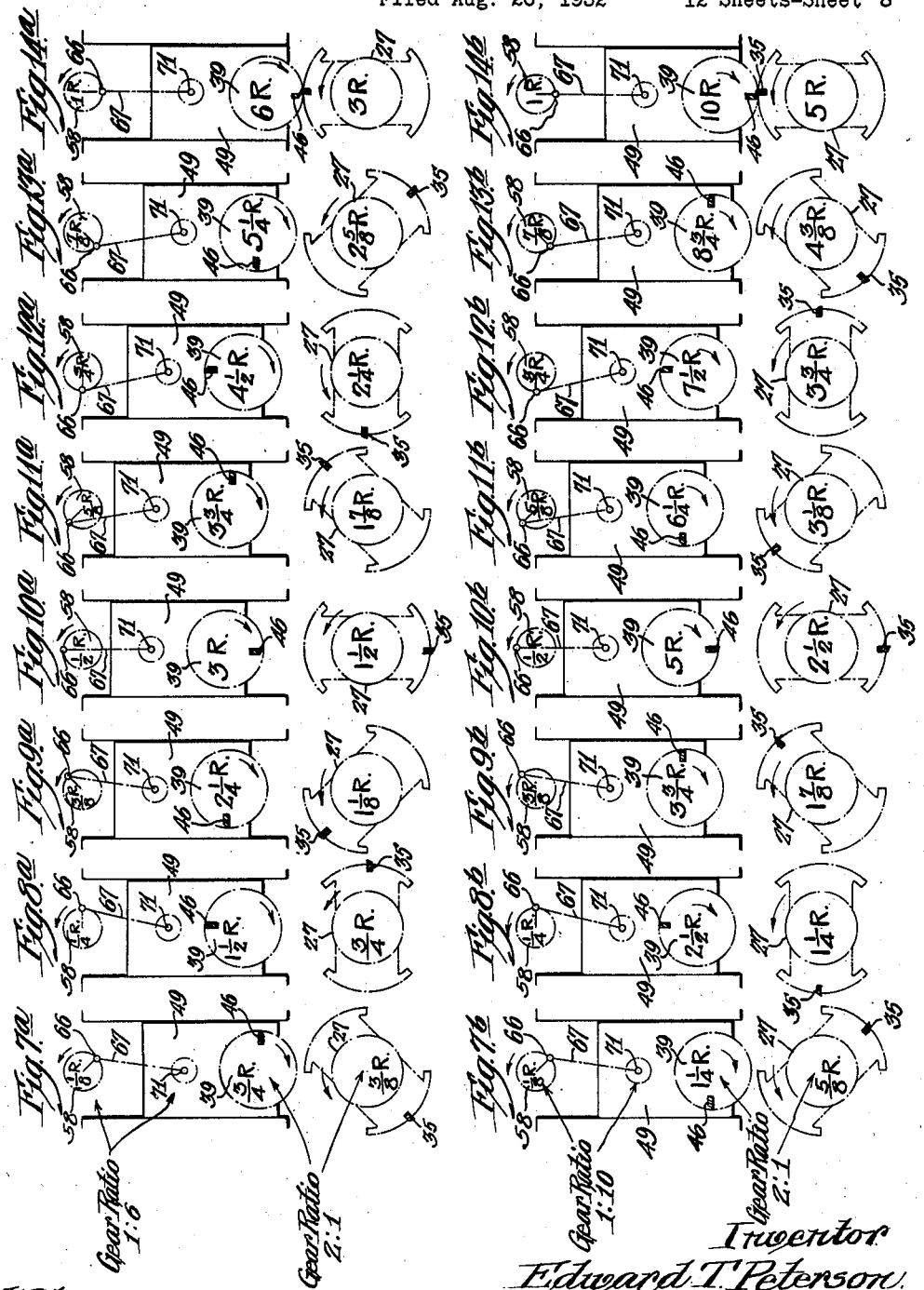

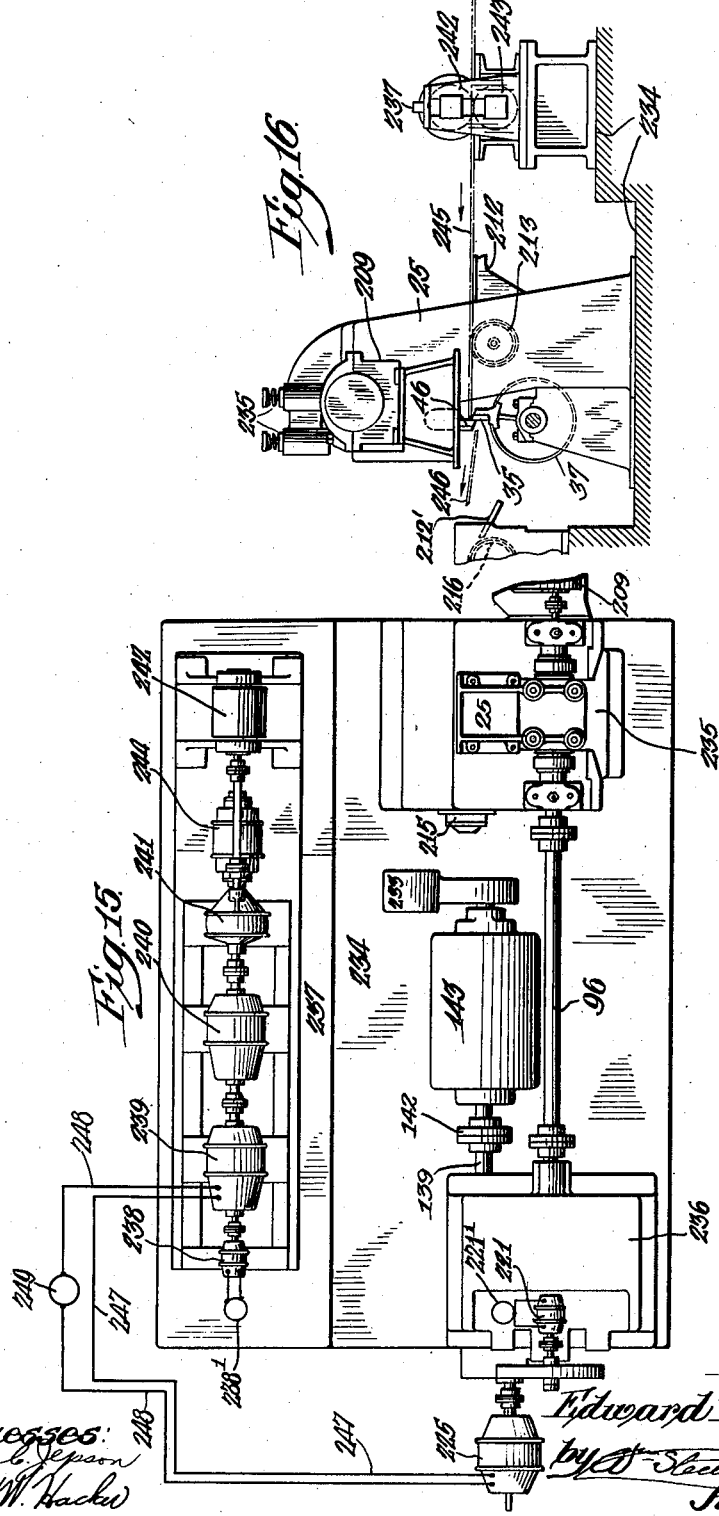

Jan. 15, 1935.  E. T. PETERSON  1,988,215
FLYING SHEAR
Filed Aug. 26, 1932   12 Sheets-Sheet 12

Witnesses:
Geo. C. Jepson
Chas. W. Hacker

Inventor
Edward T. Peterson
by
Attorney

Patented Jan. 15, 1935

1,988,215

UNITED STATES PATENT OFFICE 1,988,215

FLYING SHEAR

Edward T. Peterson, Reading, Pa.

Application August 26, 1932, Serial No. 630,489

12 Claims. (Cl. 164—66)

My invention relates to machines for shearing material of various shapes in cross-section, and more particularly the art of cutting metal shapes, such as bars, sheets, strips and the like into predetermined lengths while travelling from the rolling mill. Machines of this type are commonly known as "flying shears" in which the material is fed through in cooperative relation to the cutters which operate to sever the material into such predetermined lengths. The different or various lengths into which material may be cut or sheared may be determined in various ways as hereinafter will be set forth in connection with the detailed description of the invention.

The general purpose of the invention is to provide a shearing machine of novel, but simple and rugged construction, having means whereby the material to be sheared may be conducted through the machine with less liability of interfering with the rotating cutters than heretofore has been the case.

It also is a purpose of the invention to provide a highly desirable form of shear wherein the cutters have, simultaneously, a relative bodily movement toward, and from each other, and a movement of rotation.

This invention has for one of its purposes to secure a shear having one revoluble cutter in fixed bearings and another cutter in bearings reciprocable within a housing, the reciprocated parts being counterbalanced.

Still another purpose is to provide a shear with relatively reciprocatory revoluble cutters, on one of which the knife or knives are angularly adjustable.

A further purpose is to provide a shear with both rotary and reciprocatory movements which may be either continuously or intermittently operated.

A further purpose is to provide a shear with revoluble cutters, the said cutters and their supports being statically and dynamically balanced and having reciprocatory movement of one of the revoluble cutters.

Still another purpose of the invention is to provide a shear with two rotating cutters, one of which has reciprocatory movement, using interfitting gearing at both ends of the cutters to protect the parts against angular distortion between the locations of the gearing.

A further purpose is to provide a shear with cutters having simultaneously, a relative bodily reciprocating movement toward and away from each other and a movement of rotation, wherein the rate of reciprocation may be increased or decreased without disturbing the speed of the revoluble cutters.

A further purpose is to provide a shear having two relatively reciprocatory revoluble cutters, with change gear mechanism for varying the speed of reciprocation.

In a shear having relatively reciprocatory revoluble cutters, a further purpose is to mount auxiliary gearing on the shafts of the cutters, supplemental to the main gearing and on the ends opposite to the main gearing, the auxiliary gearing being in mesh while maximum power is required; i. e. at the time when the cutters are in cutting relation, one with the other and preferably not in mesh at other times.

A further purpose is to provide a shear with revoluble cutters, one of which is arranged for reciprocatory movement in addition to the rotary movement and having auxiliary gearing on the shafts of the cutters, on the ends opposite to the main gearing, one of the engaging gearings, preferably the auxiliary gearing, being provided with angular regulations of the meshing gear teeth, reducing back lash and insuring exactness of registration of the cutters throughout their lengths.

A further purpose is to provide a shear in which one of the cutting means is rotatably supported in stationary bearings while the other of said cutting means is rotatably supported in bearings which have a reciprocatory motion, such motion taking place simultaneously with the rotary movement of the cutting means supported by the said bearings and to operate the reciprocating mechanism by a cam and connections carried by fixed parts, giving a direct downward thrust for shear operation.

A further purpose is to transmit power to the reciprocating shear blade through a long shaft and universal joint.

The more rapid the reciprocation of the rotary cutting mechanism the shorter the sections of plate or strip cut.

From experience it is generally accepted that it is desirable to provide an instantaneous cutting speed of the revoluble cutters which is substantially equal to the speed of travel of the strips being sheared. I have found, however, that the instantaneous speed of the cutters may be different from the speed of the material being sheared, to an extent as great as ten percent faster or ten percent slower, depending greatly upon the physical characteristics of the material being sheared.

This variation in speeds may be utilized if desired, for producing all of a series or range of predetermined lengths into which the material is being cut, without any mechanical change in the machine or the gearing, as indicated, or separate and more or less standard lengths or ranges of cut may be accommodated with little or no relation to each other.

By supplying a series or set of change driving gears for the reciprocating mechanism the several rates of reciprocation may be made so closely related that all intermediate lengths of strip or work can be cut from the shortest to the longest of the intended range.

Beginning with the most rapid speed of reciprocation, the work can be slowed down to run at a speed approximately ten percent slower than the peripheral speed of the knives for the shortest cuts and at a speed of ten percent faster than the peripheral speed for the longest cuts at this rate of reciprocation. The length for the longest cuts at the fastest speed of reciprocation may be made to correspond with the shortest cuts at the next slower rate of reciprocation, secured by again slowing the feed of the work below the peripheral speed of the knives. The length of cut obtainable at this next slower rate of reciprocation by speeding up the work may again correspond to the shortest cut for the next slower rate of reciprocation, secured by slowing the work.

The motors provided for driving the shears and the rolls may be of any desired construction; but in this instance I preferably select direct current motors, whereby the desired variation of speeds may be readily obtained, and supplied by a reliable source of electric current under a voltage which can preferably be definitely set and maintained at that setting.

Without undertaking to point out here the various other purposes and advantages of the invention, I shall now proceed with a more detailed description thereof wherein other advantages and purposes of the invention will be referred to specifically, or else will become apparent.

To facilitate a clear understanding of the invention, reference should be had to the accompanying drawings forming a part of this specification and wherein I have illustrated a shear including a preferred embodiment of the invention which is practicable, effective and highly desirable and which at the same time well illustrates the principles of my invention. However, it is to be understood that the invention may be embodied in many forms of construction other than that shown within the scope of the claims without departing from the invention or from the spirit thereof.

Describing in illustration, and not in limitation and referring to the drawings:

Figure 1 is a view of my preferred shear in vertical transverse section taken substantially on line 1—1 looking in the direction of the arrows, on Figures 2 and 5, and enlarged with respect to Figure 5.

Figure 2a is an enlarged sectional view taken on line 2a—2a of Figure 2 showing the adjustable shaft coupling.

Figure 2b is a side elevation of the structure of Figure 2a.

Figure 3a is an enlarged transverse section on line 3a—3a of Figure 3 showing the clutch locking means.

Figure 3b is an enlarged cross section of Figure 3 taken upon line 3b—3b, showing a clutch hub and shaft, shifter rod and tube and looking in the direction of the arrows.

Figure 3c shows an enlarged view in section through the hub of a double clutch on line 3c—3c of Figure 3.

Figures 3d and 3e are enlarged fragmentary top and bottom plan views, respectively, of a clutch shifter tube seen at the upper left in Figure 3.

Figure 4 is a left hand end elevation of the driving means shown in Figures 3 and 5, to enlarged scale with respect to Figure 5.

Figures 7 to 14 are diagrammatic sections showing the positions of the cutting means for one particular gear ratio at each and every 45 degrees in a complete revolution of the crank shaft, and correspond to a portion of Figure 1 with the crank shaft advanced 45 degrees from the position shown by Figure 1.

Figures 7a to 14a are diagrammatic views of a cutting means shown in Figures 7 to 14 except with a different gear ratio.

Figures 7b to 14b are diagrammatic views similar to Figures 7a to 14a, but with still a different gear ratio.

Figure 15 is a reduced scale top plan view of feeding and control mechanism used by me.

Figure 16 is a partial side elevation of part of my structure omitting some of the parts.

Like numerals refer to like parts in the drawings.

Figure 2:
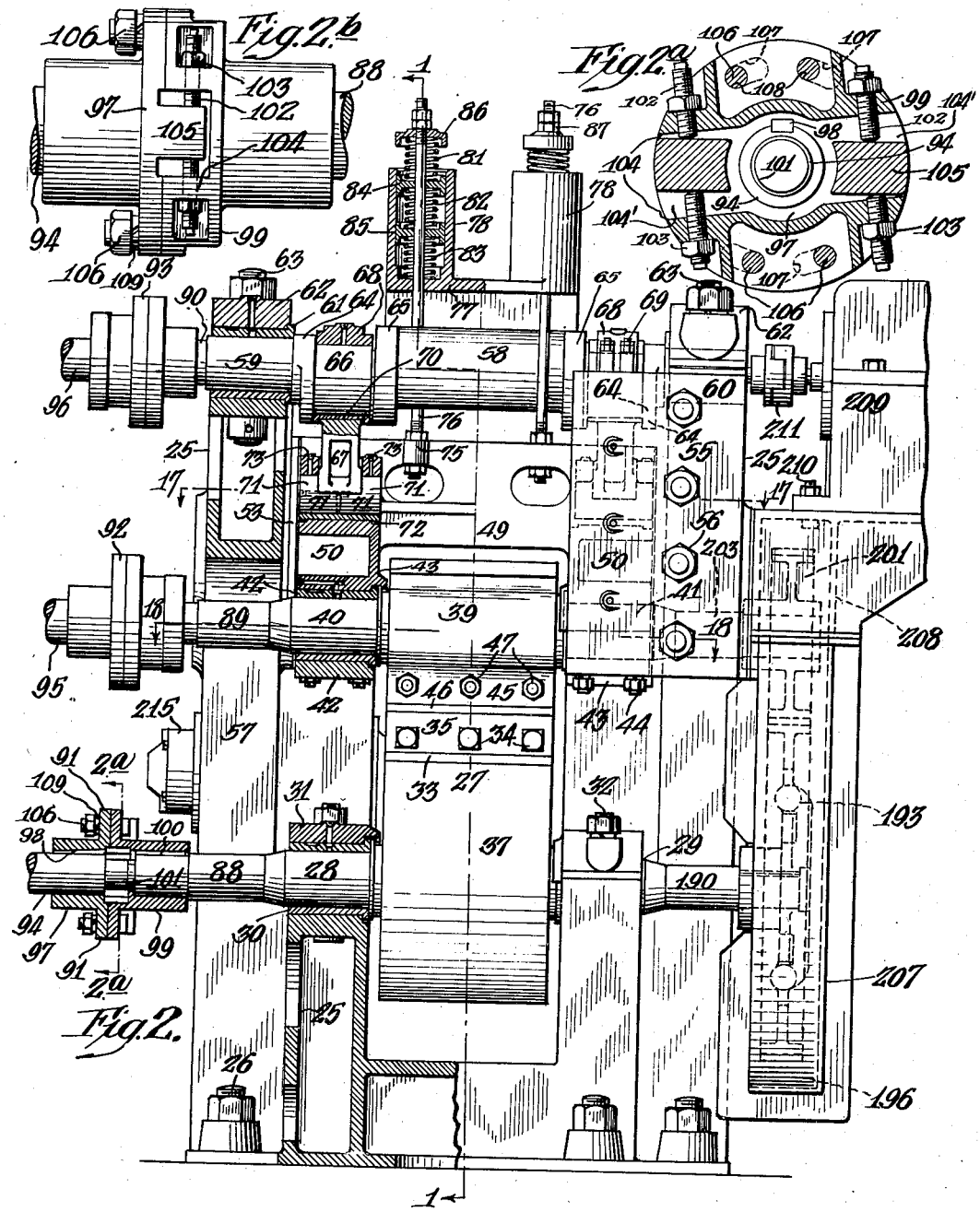
Figure 2 is a view partly in front elevation and partly in longitudinal vertical section on line 2—2 in Figure 1, looking in the direction of the arrows.

In the drawings, referring to Figures 1 and 2, I have shown at 25 a housing upon and by which the cutting mechanism of the machine is mounted and supported. It is fastened in position by hold down bolts 26. This mechanism comprises a revoluble support 27 for the lower cutter blade, having journals 28 and 29 which are rotatably mounted in bearings 30 provided upon the housing 25. The said bearings include a removable cap portion 31 held in position by bolts 32, by the removal of which the revoluble support 27 may be removed from the shear. Another support of different size with another gear ratio may then be substituted.

The revoluble support 27 is provided with a lateral axially elongated projection 33 to which is secured by means of fastening bolts 34, a cutter or knife 35. The projection 33 is so related to the support 27 that, when the cutter or knife 35 is secured in position, the cutting side thereof, including the cutting edge, occupies substantially a plane including the axis of the support 27. In other words, the cutting plane of the cutter 35 is in radial alignment with the axis of the revoluble support.

Figure 23:
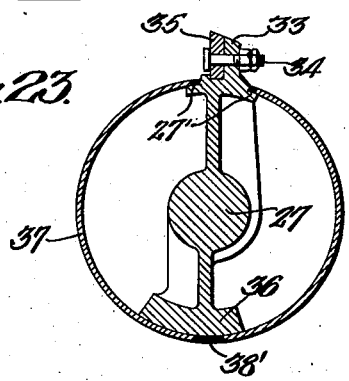
Figure 23 is a section of the lower cutter blade, somewhat modified in construction from the form shown in Figure 1, for example.

A counterbalance 36 is provided on revoluble support 27, diametrically opposite to and for the balancing of the lateral elongated projection 33, bolts 34 and knife 35, and, circumferentially between projection 33 and counterbalance 36, arcuate plates 37 and 38 are welded or otherwise fastened to the rest of the structure so as to form a circular drum having the knife 35 and its fastening projecting beyond. The arcuate plates may be formed in one piece, completely covering the counterbalance and secured thereto by weld 38' as shown by Figure 23 or by any other type of fastening, and desirably welded at 27' to the revoluble support 27.

In opposed spaced relation to the revoluble support 27 is a revoluble support 39, the journals 40 and 41 of which are rotatably mounted in bearings 42. The said bearings include removable cap portions 43 held in position by means of bolts 44, by the removal of which the support 39 and its attached cutter may be bodily removed from the machine, for replacement by another cutter of different size and gear ratio. The revoluble support 39 is provided with a lateral axially elongated projection 45, to one side of which a cutting element 46 is removably secured by means of fastening bolts 47. The projection 45 is so located with respect to the revoluble support 39 that, when the cutter or knife 46 is secured in place, the side upon which its cutting edge is formed, is located in a plane including the axis of revolution of the support 39. In other words, the plane of the side of the cutter 46, embodying the cutting edge, is radially arranged with respect to the axis of the revoluble support 39.

In order to prevent excessive vibration of the revoluble support 39, (due to the centrifugal force of the elongated projection 45, cutting element 46 and bolts 47), a counterbalance 48 is provided on the opposite side of the support 39.

Instead of providing counterbalances 36 and 48 on the revoluble supports 27 and 39, I may choose to use two cutting elements on either or both, which would replace the counterbalances.

Figure 17:
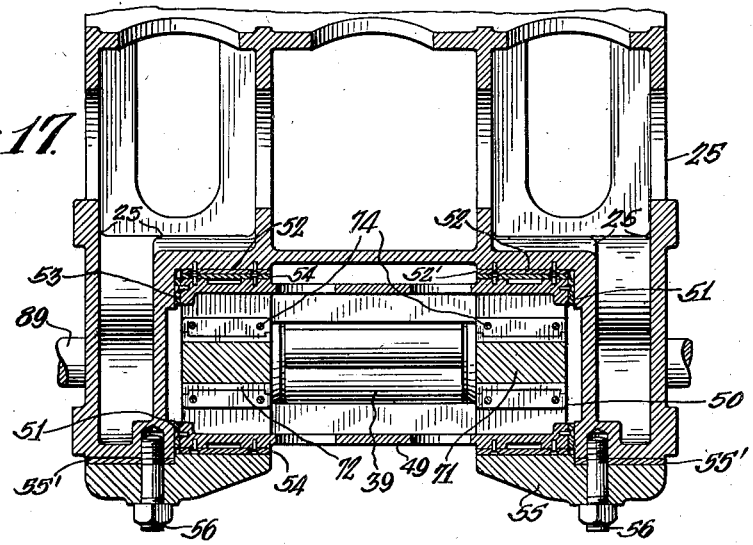
Figure 17 is a horizontal section on lines 17—17 of Figures 1 and 2 looking in the direction of the arrows, illustrating the method of guiding the crosshead.
Figure 18:
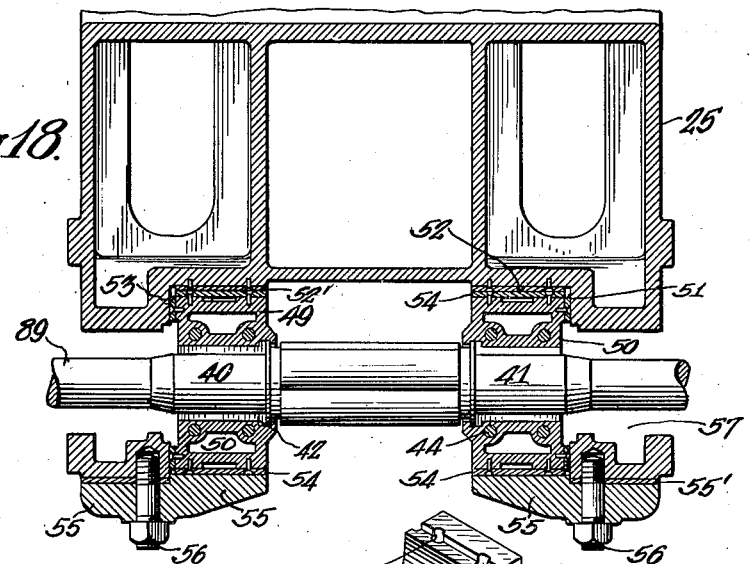
Figure 18 is a view in section substantially on line 18—18 of Figures 1 and 2, showing the upper revoluble cutter and support in plan view.

The bearings 42 for the support 39 are provided in the lower portions of the opposite ends of a ram or crosshead 49 having opposite sides 50. The faces of the crossheads are located in guides within the housing structure as indicated at 51 and 52 (Figures 17 and 18) and carry wear plates 53 and 54 held in place by screws or other means. Wear plates 52' are fastened to the faces of the housing 25.

On the outside, detachable guide plates 55 are secured by bolts 56, by the removal of which the crosshead may be removed from the machine, or the play between the crosshead 49 and the said guides may be adjusted.

Shims 55' are provided for the adjustment of the guide plates 55. The opposite ends of the housing 25 are cut away as indicated at 57 to permit the journals 40 and 41, at the opposite ends of the revoluble support 39 to enter the bearings 42 upon the opposite ends 50 of the crosshead.

The revoluble crank or eccentric shaft 58 is journaled at 59 and 60 with bearings 61 secured by caps 62. The caps are fastened to the housing 25 by bolts 63. The shaft carries cranks 64 and 65 between which the offset journals 66 are located. The said bearings 61 are detachably secured to permit the removal of the revoluble shaft 58 from the machine.

The eccentric or crank portions 66 of the shaft 58 are rotatably connected to the pitmen 67 by caps 68 removably held to the pitmen by bolts 69. Renewable bearings 70 are supplied to engage journals 66 on the bottom portions only because the thrust from the cranks occurs there.

Figure 19:
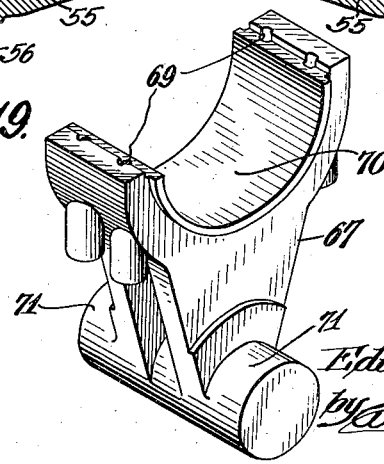
Figure 19 is a perspective view of a pitman shown in Figures 1 and 2.

The pitmen 67 (Figure 19) terminate at their lower ends in T portions in the form of journaled trunnions 71 which are connected in the bearings 72 located in the upper portions of the two sides of the crosshead 49 previously referred to. The pitmen 67 are prevented from becoming disconnected from the said crosshead by removable caps 73 secured thereto by bolts 74 over the trunnions 71 of the said pitmen. The trunnions 71 are provided with renewable bearings 72 on the thrust sides only of the trunnions.

Rotation of the shaft 58 and its eccentric or crank portions integral therewith, effects reciprocatory movements of the crosshead 49 which includes the bearings 42 for the journals 40 and 41 of the revoluble support 39 above. It is apparent that upon rotation of the shaft 58 and of the eccentric or crank portions 64 and 65, integral therewith, the crosshead 49, with the bearings 42, is reciprocated and that such reciprocation causes corresponding reciprocatory movements of the support 39 and of the cutter 46 mounted upon it.

For the purpose of counterbalancing the weight of the crosshead 49, support 39 and the other reciprocating parts carried by them, I have connected to crosshead lugs 75 upon the crosshead 35 rods 76 which extend upwardly through a cross plate 77 and through spring cases 78. The cross plate and a cap portion 79 are secured by bolts 80 to the top of the housing 25. Helical springs 81, 82 and 83 are mounted in tandem upon each of the rods 76 and in the cases 78. The adjoining ends of the sets of springs on each rod are separated by means of spring seats or discs 84 and 85 mounted and free to slide upon the rods. The lower ends of the coiled springs 83 are seated against the plate 77, while the upper ends of springs 81 are seated against the plates or washers 86 which are retained in place, or adjusted by nuts 87, upon the upper ends of the rods. The adjustment is provided so as to obtain the proper balance of the reciprocated parts.

While four nests of three helical springs each are shown, any other type or number of balancing springs may be used.

When the crosshead 49, including the parts supported by it, is moved downwardly by the cranks, the springs 81, 82 and 83 are compressed and their tendency to expand aids in the upward reciprocatory movements of the crosshead.

From the tendency of the above mentioned balancing springs to always hold the reciprocated parts in a raised position it is apparent that wear bearings 70 and 72 are required on the bottom or thrust faces only of the journals 66 and 71, the crank shaft being needed to force the crosshead 49 and its attendant reciprocated part in a downwardly direction but not being required for the upward movement.

Figure 6:
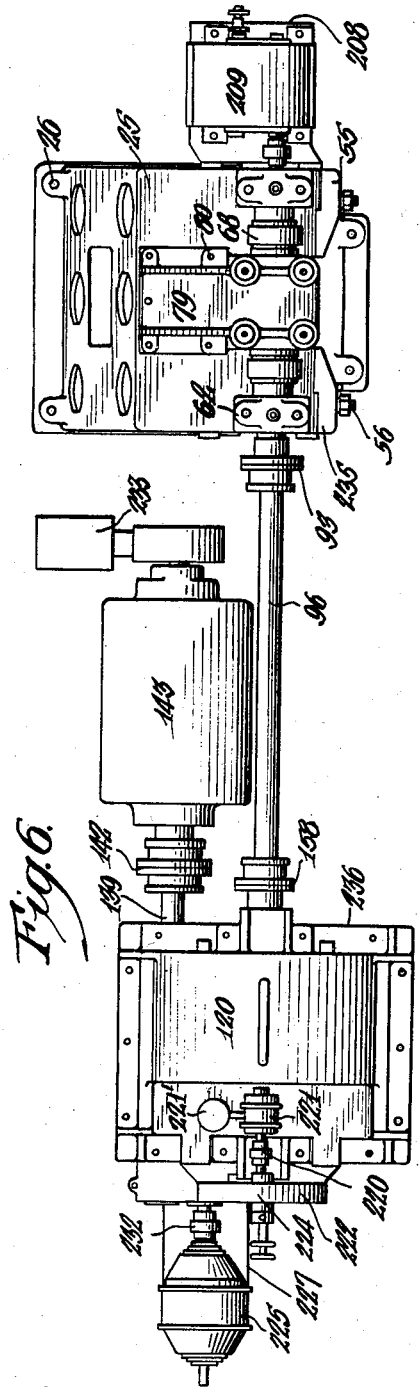
Figure 6 is a top plan view of Figure 5.
Figure 5:
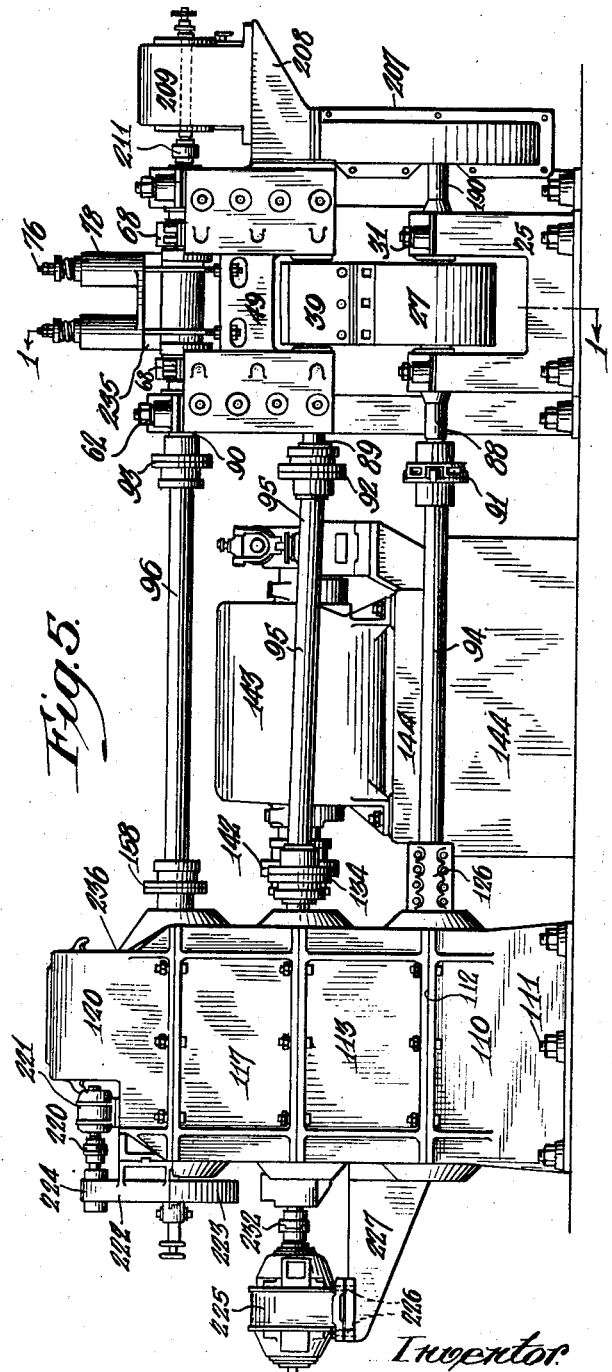
Figure 5 is a side elevation of my shear, including the structure seen in Figures 1–4, showing both the cutting means and the driving means on a reduced scale.

Projections 88, 89 and 90 (Figure 2) extend from the journals 28, 40 and 59 in alignment therewith, which projections are connected by means of couplings 91, 92 and 93 to shafts 94, 95 and 96, respectively, (see Figures 5 and 6).

The coupling 91, connecting shafts 88 and 94, is equipped with means for rotative or angular adjustment as is clearly shown by Figures 2, 2a and 2b. The shaft coupling flange 97 is shrunk or forced on shaft 94 and is further prevented from rotation on this shaft by key 98. Likewise the companion flange 99 of the coupling 91 is secured to its shaft and is keyed to it at 100. A circular projection 101 on shaft 94 fits into a concentric opening in coupling flange 99 and permits alignment of the two shafts 88 and 94. The rotative adjustment of the said shafts is accomplished by the positioning of the set screws or studs 102 (locked by jam nuts 103) screwed through ribs 104 in coupling flange 99, and lugs 105 integral with coupling flange 97. The lugs project into canties 104' of flanges 99. The parts of coupling 91 are securely clamped together after adjustment, by clamping bolts and nuts 106 located in slotted holes 107 in one flange and in round holes 108 in the other, the slotted holes being covered with washers 109 so as to present flat surfaces for the application of nuts on bolts 106.

The coupling 92 on shaft projection 89 is of a conventional type of flexible coupling or universal joint to allow for the reciprocatory movement of the revoluble support 39, and for the disalignment of same. The conventional type of flexible coupling 93 on projection 90 of crank shaft 58 allows for misalignment of the shafts 58 and 96 and for the vibration of the machine.

In Figures 3, 4, 5, 6 and 20 a gear case or housing for the driving means appears, which may be made of an integral casting or of different parts fastened together, but in this particular instance is made of various parts for convenience in assembling.

Gear case base 110, secured to its foundation by bolts 111, has placed upon its upper surface 112 an intermediate portion 113, secured thereto by bolts 114, through the flanges 115, and upon the top face 116 of said intermediate portion, there is mounted the upper section 117, secured thereto by bolts 118 through flanges 119. A cover 120, surmounting the whole and secured to section 117, by bolts 121 through flanges 122, completes a relatively simple, dust and dirt tight transmission case for the gears and clutches of the driving means.

The shaft 123 with journals 124, rotatably mounted in bearings 125 held between base 110 and intermediate section 113 of the gear case, is connected to shaft 94 by coupling 126, so that both shafts are driven at equal speeds. The shaft 123 is provided with a gear 127, held from turning on said shaft by key 128 and meshing with gear 129 which, with the number of blades on the lower support and the ratio here illustrated is one-half the size of gear 127. Gear 129 is secured by key 130 to shaft 131 which has journals 132 mounted in bearings 133, said bearings being located between intermediate and top sections 113 and 117 of the gear case. The shaft 131 is connected by flexible coupling 134, of a conventional flexible type, to shaft 95. In the construction illustrated, with the gear ratio chosen, shafts 95 and 131 and support 39 driven by them are driven at twice the rate of speed of the shaft 123; from which it follows that support 39, is driven at twice the rate of speed of the shaft 94 and the support 27. However, the rotation of these parts at this rate of speed is one illustration only of a preferred form, and is not necessary to my invention as the shaft 95 and the support 39 may be rotated at a different relative speed, having a desired predetermined relation to the speed of rotation of the support 27.

Figure 20:
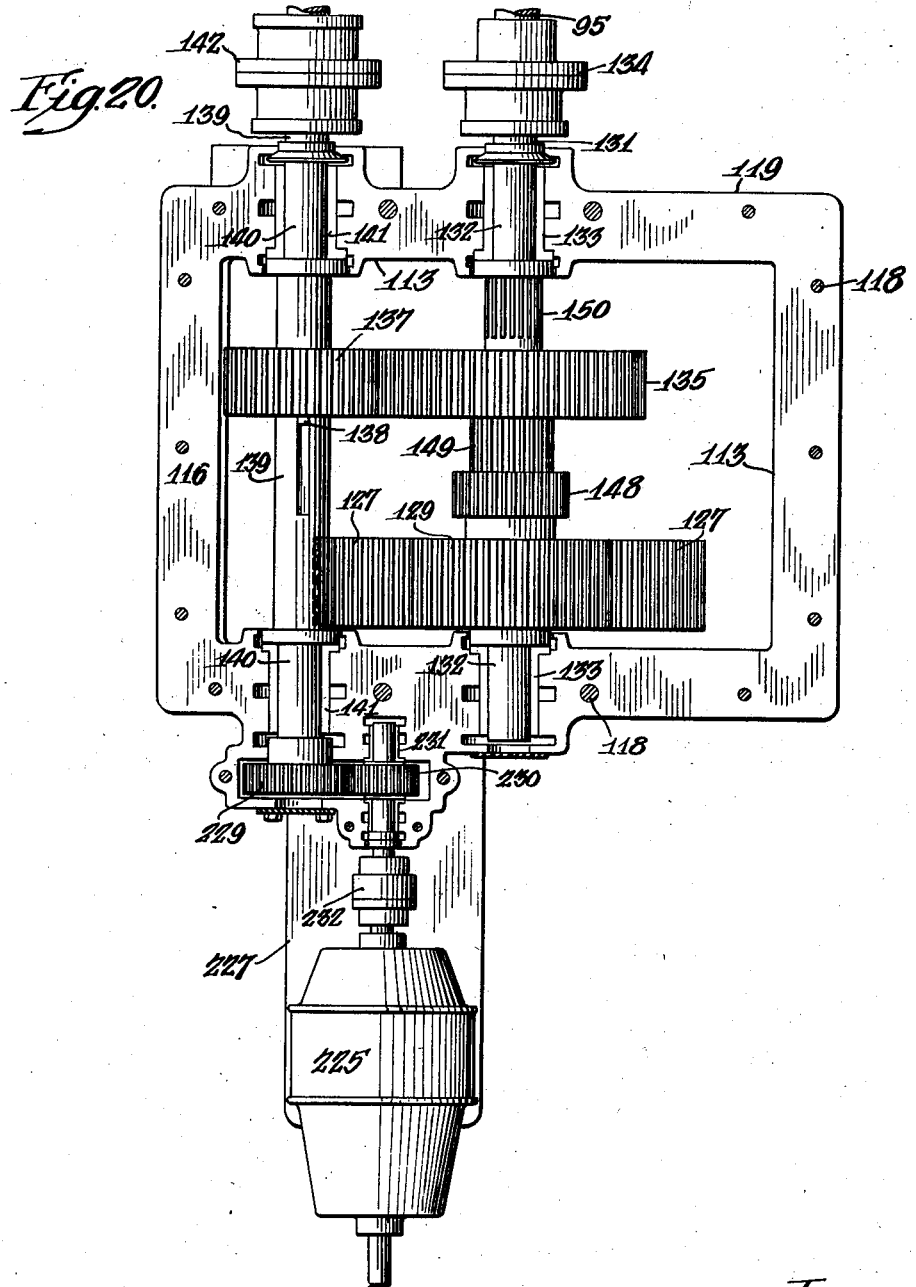
Figure 20 is a plan view of the driving means, with the upper portion of the gear case above line 20—20 in Figures 3 and 4 removed.

Gear 135, mounted on shaft 131, and prevented from turning thereon by key 136, meshes with gear 137, as shown in Figure 20, which latter is secured by key 138, on shaft 139. Its journals 140 run in bearings 141, located between sections 113 and 117 of the gear case. The inner end of shaft 139 is securely connected by a conventional type of coupling 142, to the shaft of the shear driving motor 143, supported on foundation 144 all clearly shown on Figures 5, 6 and 15.

Figure 3:
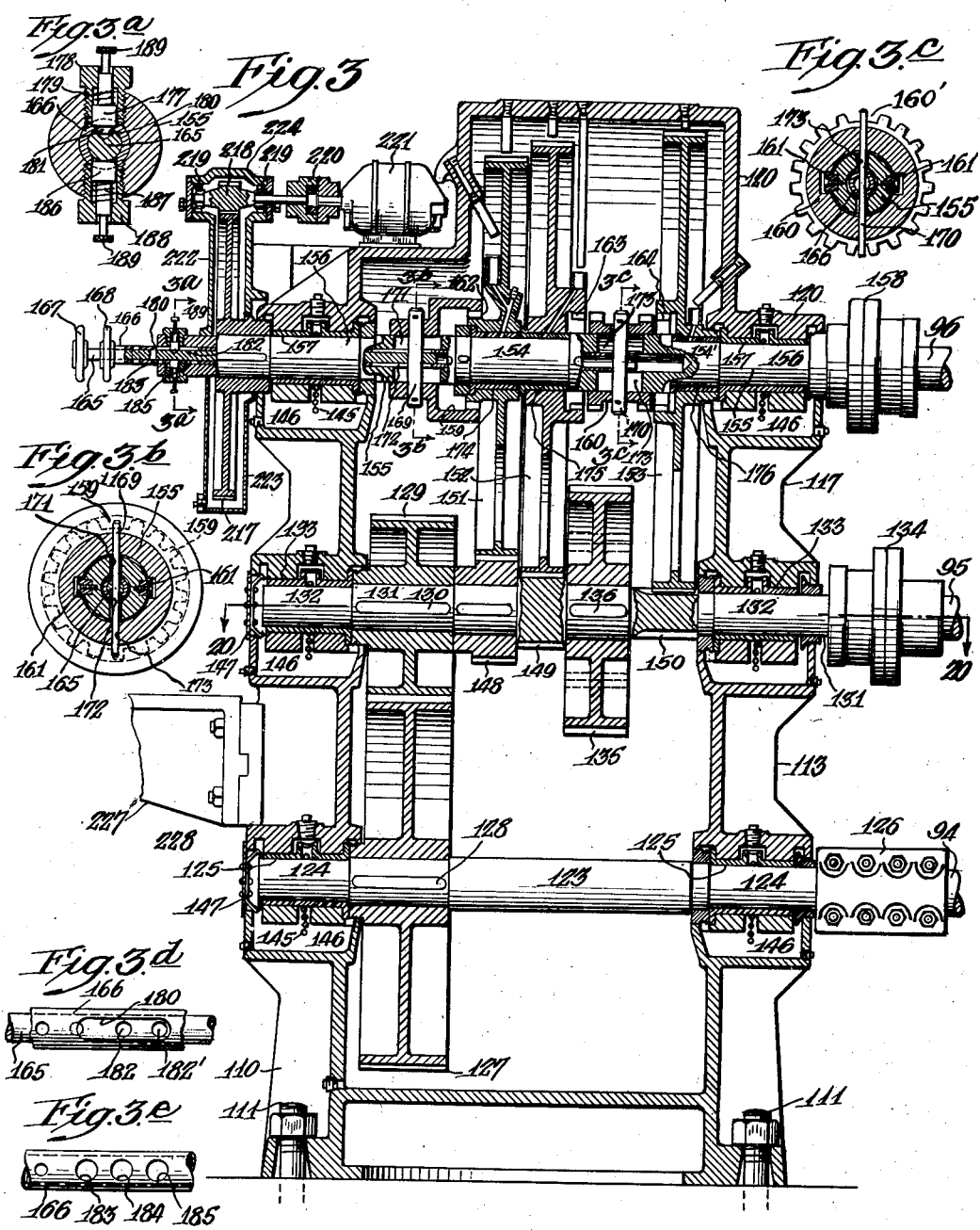
Figure 3 is a vertical section on line 3—3 of Figure 4, looking in the direction of the arrows, showing the gear ratio changing arrangement and the driving means.

Journals on the various shafts are lubricated by means of lubricating chains 145 dipping down into lubricating material in oil pockets 146, examples of which are seen in Figure 3. The outside journals 124 and 132 are protected from entrance of foreign matter by dust caps 147 (Figure 3).

Upon shaft 131 are mounted pinions 148, 149 and 150, either formed integral therewith, or else constructed separately and secured thereto so as to revolve as a unit. Meshing with the before mentioned pinions are gears 151, 152 and 153, respectively, all seen in Figure 3, which are journalled, 151 and 152 at 154, and 153 at 154' upon shaft 155. These gears 151, 152 and 153 may be free to revolve on the shaft 155. One of these gears may be clutched to said shaft so that the shaft will revolve with the selected gear as a unit. The shaft 155 is bored at one end for reception of clutch operating means and is provided with journals 156 in bearings 157 (Figure 3), mounted between the upper section of the gear case 117 and the cover 120. It is connected to shaft 96 by a conventional type of coupling 158 so that the two said shafts will revolve simultaneously and as a unit.

In this particular instance pinion 148 and gear 151 meshing therewith have a ratio of 1:4, pinion 149 meshing with gear 152 have a gear ratio of 4:6, and pinion 150 and gear 153 have a ratio of 1:10. Thus it is apparent that the speed of shaft 131 with respect to the speed of shaft 155, may be to each other as four to one, six to one, or ten to one, depending upon which gear is clutched to shaft 155. Although I have chosen the three gear ratios above it is obvious that any other ratios of gearing or number of ratio combinations may be used.

Slidably mounted on shaft 155, the single jaw clutch 159 and the double jaw clutch 160 are held for unitary rotation therewith, by keys 161 (Figure 3c), and are arranged for engagement with the clutch portions forming part of their respective gears.

On the drawing, clutch 159 is shown in engagement with the clutching portion 162 forming part of gear 151 (Figure 3). When engaged the shaft will revolve at the same speed as the said gear. The double clutch 160 is shown in the neutral position, namely, out of gear with both clutching portions 163 and 164 of gears 152 and 153 respectively.

To secure a shearing position of the cutters 35 and 46, the cranks on shaft 58 (Figures 1, 2, 7-14) must be in a down position when the cutters are in juxtaposition. Therefore to secure this position I have provided a double width of tooth and a double width of space for the clutches as indicated by 159' and 160' on Figures 3b and 3c in order that the clutches will always mesh at the same angular position with their component parts located on their respective gears.

When it is required to change the speed of shaft 155 to any one of the combinations provided, it is necessary to release either, or both latches 177 and 186 shown by Figure 3a, and to shift the clutch or clutches into the proper position by the use of handles 167 and 168.

The clutch shifting rod 165 slides within clutch shifting tube 166, which tube in turn slides within the hollow shaft 155, the said tube being concentric with both the rod and shaft. Either tube or rod can thus be moved longitudinally without moving the other.

Handle 167 is mounted upon the outer end of rod 165, and on the inner end clutch 159 is held by key 169, slidable longitudinally in slot 171 of shaft 155 and in slot 172 located in tube 166, as clearly shown in cross-section by Figure 3b. Therefore as handle 167 is moved to and fro, the clutch 159 is shifted a like distance, i. e. out of or into engagement with gear clutch portion 162. Likewise for the movement of clutch 160 to engagement with either clutch portions 163 or 164 or to its neutral position, handle 168 is connected to the outer end of clutch shifting tube 166. To the inner end of this tube 166, clutch 160 is connected by key 170 tightly fitting in both tube and clutch, but slidably passing through the slot 173 located in hollow clutch shaft 155, clearly shown in cross-section by Figure 3c.

The gears 151, 152 and 153 are provided with bearings 174, 175 and 176 respectively, and are rotatable on the shaft 155 or attachable to it by the clutches.

The previously mentioned latch 177 (Figure 3a) locking the clutch 159 either in or out of engagement with its component part, does so by protruding through slot 180 in tube 166 shown by Figures 3a and 3d and having the reduced portion 181 thereof projecting into one or other of openings 182 and 182' of rod 165. The latch above mentioned is guided in the cap 178 in which there is a cavity containing a helical spring 179 compressed between the cap and a shoulder on the latch. The expansion of the spring causes the latch 177 to be held in latching contact with rod 165.

In like manner the latch 186 guided in cap 188 is pressed by spring 187 to hold the shifter tube 166 in the desired position through engagement of the end of the latch within one or other of holes 183, 184 or 185 of said tube, shown on Figure 3e. The latch cases or caps 178 and 188 are secured to the outer end of the revoluble shaft 155, as seen at the upper left in Figure 3. The latches are disengaged from the shifter rod and tube by pulling outward on the outside projecting knurled collars 189 of the latches.

In the foregoing I have described by way of example a speed changing transmission having three possible changes effected by the use of sliding clutches, though other combinations or number of combinations or changes and other types of clutches and transmissions may be employed.

Figure 21:
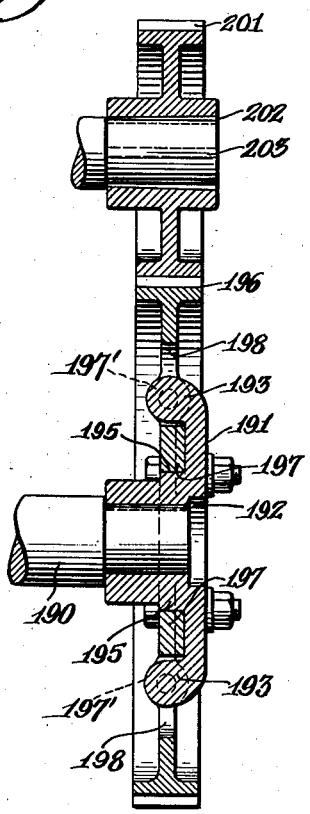
Figure 21 is a fragmentary section, substantially on line 2—2 of Figure 1 and on line 21—21 of Figure 22, showing the segmental gear and pinion and the angular adjustment for the back lash of the cutters. The scale is enlarged with respect to Figure 1.
Figure 22:
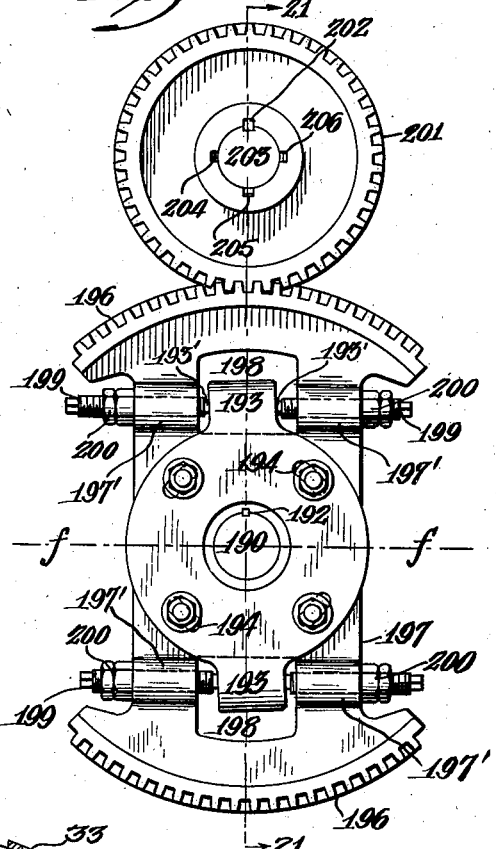
Figure 22 is an end elevation of the structure of Figure 21, showing the angular adjustmen means for the auxiliary gears.

Extending from the journal 29 (see lower right of Figure 2) of the revoluble support 27 (shown in Figures 1 and 2), is the shaft portion 190 upon which is mounted a hub 191 held from revolving thereon by the key 192, as clearly shown on Figures 21 and 22. The hub carries a nearly radial plate portion terminating in projecting integral lugs 193. Elongated bolt holes 194 (Figure 22) pass through the plate portion outside the integral boss 195. The segmental gear 196 is centrally apertured through its web 197 so that the gear can engage with the said boss of the adjustable hub.

The web 197 is provided with holes 198 into which the lugs 193 project. The set screws 199 provided with lock and jamb nuts 200 are threaded through enlarged portions 197' in the web 197 of the gear 196 and bear upon the opposite faces of the projecting lugs 193 which are integral with the hub 191. It will be observed that by the movement of the said set screws binding upon the faces of the said lugs, I have provided a practical method for rotary adjustment of the segmental gear 196 in relation to its angular position upon the shaft 190, furnishing the segmental gear and its meshing pinion 201 with circumferential tooth adjustment whereby any back lash of the revoluble cutters 35 and 46 (Figures 7–14) may be avoided or reduced to a minimum.

The pinion 201 is keyed at 202 to shaft 203, and thus revolves with revoluble support 39. Additional key-ways 204, 205 and 206 provide for future positions of pinion 201 upon its shaft 203. Thus I have made provision for longer life of the said pinion by using the different positions provided.

As will be explained later, the pinion 201 is in mesh with the gear 196 for a small portion only of each revolution, that is, when the cutters are in juxtaposition and in cutting relation to each other. The pinion and gear are enclosed in the gearing guard 207 and 208. The upper portion 208 is secured to housing 25 and forms a bracket for the limit switch 209 which is fastened to it by bolts 210. The limit switch 209 has its shaft connected to the crank shaft 58 by coupling 211.

The strip approach table 212, shown on Figure 1, is secured to the central portion of the housing 25. Adjacent to it is a roller 213 keyed to shaft 214 mounted in bearings upon the housing. The roller is rotated by a motor located in the housing, having a portion projecting beyond the housing at 215, shown in Figure 2. To the left of the shearing machine in Figure 1 is shown a fragmentary portion 212' of the apron with roller 216 of the adjoining receiving table, to which the sheared strips are discharged.

Mounted upon shaft 155 and keyed to it for unitary rotary movement with it, is a gear wheel 217 (seen at the upper left in Figure 3) meshing with the driving pinion 218. (See also Figure 4).

Pinion 218 is mounted upon or is integral with a shaft which is journaled in bearings 219. The shaft is connected by coupling 220 with a "crank-speed indicating generator" 221 which is carried by the transmission cover 120. Since the generator is rotated by the variable speed shaft 155, as the speed of shaft 155 is changed by the shifting of the clutch 159 or 160 to different gear ratios with the driving shaft 131, so will the speed of the generator 221 be changed in like ratio.

The shear-speed indicating generator or crank-speed indicating generator 221, rotating at a fixed ratio with the crank shaft 58, generates a voltage in direct ratio to the speed of the said crank shaft, which shaft provides the reciprocatory movement of the revoluble cutters. The voltage generated causes a reading in revolutions per unit of time upon the dial of a speed indicator 221' thus showing at a glance the cutting speed of the shears. The speed indicating generator 221 and the speed indicator 221' act simply as a tachometer.

The gear case 222 with its cover 223 secured

6 to the transmission cover 120 and with the 224, forms an enclosure for the gear 217, 218 and the bearings 219.

The "shear pilot generator" (Figures 4, 5, 6 and 20, is fastened by bolts 228 to bracket 227 (Figure 4) to the "shear pilot generator," 225. This 228 is fastened to bracket 227. This generator 228 is fastened to bracket 227 with pinion 228 meshing with pinion 10 respect pinion to...

1,988,211 will be caused to make one complete movement of vertical reciprocation during four revolutions of the head 39 mounted in the bearings. It is also apparent that if the transmission, or driving mechanism, is shifted so that the crank shaft is rotated by pinion 149 and gear 152 having a gear ratio of one to six, the crank shaft 58 and revoluble head 39 will revolve in the ratio of one to six, so that, as illustrated by Figures 7a to 14a, the head 39 will make six revolutions while the crank shaft 58 is making one revolution.

Again by reference to the diagrammatical Figures 7b to 14b, with the clutches shifted to a gear ratio one to ten, i. e., with pinion 150 propelling the shaft 155, the crank shaft will make one revolution while the revoluble head 39 is making ten revolutions. Thus, while the revoluble head 39 is making ten revolutions, it will make one complete reciprocation due to the eccentricity of the said crank shaft.

It will also be observed that, in every case, while the crank shaft is making one revolution, one complete reciprocation of the revoluble head 39 is effected.

Only once for each revolution of the crank shaft do the shear blades meet in cutting position, as shown for the respective gear ratios in Figures 14, 14a and 14b. The time interval between successive cutting positions is very different in the various cycles of Figures 7 to 14, 7a to 14a and 7b to 14b, being shortest in Figures 7 to 14 (for the shortest cut) and longest for Figures 7b to 14b (for the longest cut).

By reducing the speed of rotation of the shaft 58 with respect to that of the heads 27 and 39, it will be seen that the head 39 will be supported for a longer period, or longer periods, out of cutting relation with the head 27. By thus holding the head 39 and its cutter for periods of different lengths out of cutting relation to the head 27 and its cutter, the intervals between cutting operations may be varied, and thereby the lengths of the sections which are severed, are varied. The lengths of the sections sheared off by the cutters may be varied also, by varying the speed of the cutters with resepct to the speed of travel of the material being operated upon. The peripheral speed of the cutters may be as much as ten percent above, or below, the straight line speed of the work.

The materials to be cut (in the form of bars and other shapes) are fed in the direction of the arrows shown on Figure 16, to and from the cutting mechanism by means of rollers indicated on the drawings.

Figures 7 to 14, 7a to 14a and 7b to 14b clearly show successively the relative positions of the cutters at each and every forty-five degrees of rotation, i. e., every eighth of a revolution, of the crank shaft 58, starting in each case with a position in which the crank shaft has advanced forty-five degrees from the cutting position shown in Figure 1, and ending in each case with the cutters again in juxtaposition and in cutting relation just before the revoluble crank shaft has finished one complete reciprocative movement. A complete cycle is shown by repeating Figures 7, 7a or 7b after Figures 14, 14a or 14b.

It will be evident that the angular adjustment of one at least of the cutter shafts between the driving mechanism and the cutter gives an exactness of registration of the cutters not otherwise attainable. This is dependent for its accuracy upon perfect registration of the gearing, free from back-lash.

My invention contemplates the elimination of the back-lash by a take-up of gearing at the ends of the shafts beyond the cutters, at which positions I find complete gearing to be unnecessary but register segments of gears during the cutting contact. As is the practice in taking up back-lash, the corresponding teeth on the gears at opposite ends of the same shaft will be very slightly out of angular alignment.

It will be further evident that the change of the rate of relative reciprocation of the two rotary cutters by the change speed gearing makes it possible to afford a great variety in the number of turns of the cutters between registrations of the two cutters, thus altering the length of material passing through between cutting operations.

Variations in the peripheral speed of the cutters with respect to the speed of the feed of the material cut will be used, relatively speeding up the material for one cutting operation or relatively slowing the material for another cutting operation. Variations of cutting length may be rung in on all the different cutting lengths secured by the differences in change speed gearing, making it possible, if these differences due to change speed gearing be not too great, to cut to intermediate lengths.

It will be evident that the rotation of one cutter at a higher angular speed than the other (using cutters of different operating diameters, so that they have the same peripheral speed) permits the work to pass through without being cut even when the upper cutter is in its lower position, except when the lower cutter is up. The relations between these two can, of course, be varied to secure other cutting combinations.

It will be evident that the straight line reciprocating movement of the bodily movable cutter gives a highly desirable line of thrust during the cutting engagement as well as an assurance of alignment difficult of attainment otherwise.

It will further be evident that the use of a bodily fixed eccentric for reciprocation of the bodily movable cutter gives great strength and reliability of downward thrust.

It will be evident that I have provided rotary cutter support for the work upon the lower cutter shaft at a diameter bearing any relation to the cutting diameter which may be desired by the designer.

It will be obvious that additional cutting positions could be provided on each rotary cutter. The revoluble supports of the cutters are effectively shafts by which the cutters are turned.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. In a flying shear, a lower bodily fixed shear shaft, a cutter carried thereby, an upper shear shaft bodily movable to bring its axis toward and away from the fixed shaft, a cutter carried thereby, a crosshead in which the movable shaft is mounted, parallel guides for the crosshead, overcompensation for the weight of the crosshead and movable shaft, an eccentric, bearings for the eccentric and for the two shafts, a pitman connecting the eccentric and the crosshead to push the bodily movable shaft toward the fixed shaft and to allow it to move away therefrom, gearing connected with the two shear shafts and other gearing on the respective shafts normally out of engagement with one another but meshing when the upper shear shaft is moved to cutting position, whereby the shafts are during cutting supported against torsion and against back-lash.

2. In a shearing machine, a pair of cutters, a pair of shafts, one rotatably supporting each cutter, means for relatively laterally reciprocating the shafts, gearing continuously interconnecting the shafts at one end and auxiliary gearing intermittently interconnecting the shafts at the other end, the auxiliary gearing being in mesh during cutting engagements between the cutters.

3. In a shearing machine, a pair of cutters, a pair of shafts, one rotatably supporting each cutter, means for relatively laterally reciprocating the shafts, gearing continuously interconnecting the shafts at one end, auxiliary gearing intermittently interconnecting the shafts at the other end, the auxiliary gearing being in mesh during cutting engagements between the cutters and means for angularly adjusting the auxiliary gearing.

4. In a shearing machine, a pair of cutters which are adapted to cooperate to shear material, revoluble supports for the said cutters, stationary bearings for one of said supports, movable bearings for the other of said supports, a revoluble shaft having an eccentric thereon, means for connecting said movable bearings to the said eccentric, means for causing revolution of the said shaft at a speed substantially slower than the speed of revolution of the cutters, means for changing the speed of the reciprocatory motion independently of the speed of the revoluble cutters, and means for intergearing the revoluble supports at both ends of the cutters at the time of cutting to avoid back-lash.

5. In a shearing machine, the combination of cutters which are adapted to cooperate to shear material, revoluble supports for said cutters, stationary bearings for one of said supports, movable bearings for the other of said supports, a revoluble shaft having eccentrics thereon, means for connecting said movable bearings to said eccentrics, means for causing revolution of said shaft substantially slower than the speed of revolution of the said cutters, means for changing the speed of revolution of said shaft independently of the speed of revolution of said revolving cutters, means for intergearing the revoluble supports at both ends of the cutters at the time of cutting and means for angularly adjusting the intergearing.

6. In a flying shear, a pair of rotary cutter blades adapted to engage and disengage, two shafts each supporting a blade, means for driving the two shafts, means for shifting the shafts toward and from each other to bring the shafts into or remove them from the position for the blades to engage and cut and gearing carried by the shafts at the farther end of the shafts from their driving end and adapted to engage when the shafts are in cutting position in exact angular alignment of the blades.

7. In a flying shear, a pair of revolving cutters cooperating to produce shearing action, shafts for the respective cutters, the shaft of one cutter being bodily stationary and the shaft of the other cutter being bodily movable, a cross head supporting the bodily movable shaft, spring means for continuously urging the cross head in the direction to move the bodily movable shaft away from the bodily stationary shaft and a crank connected to the cross head and reciprocating it.

8. In a flying shear, a pair of intermittently cooperating revolvable cutters, shafts driving the respective cutters, a shaft and crank reciprocating one of the cutters toward and away from the other cutter, a common driving means for the shafts which drive the cutters and the shaft which reciprocates one of the cutters and gear-change mechanism between the driving means and the various shafts whereby the rate of reciprocation of the reciprocable cutter with respect to the rates of revolution of the cutters may be varied.

9. In a flying shear, three generally parallel long shafts, one above another, driving means at one end of the shafts, flexible connections between the driving means and the shafts, cutters on the two lowermost shafts cooperating at intervals, a crank and crank arm upon the uppermost shaft, the crank arm being connected to the middle shaft to reciprocate the cutter mounted upon that shaft and gear-change mechanism in train between the driving means and the upper shaft, whereby the rate of reciprocation of the upper shaft with respect to the rates of revolution of the cutters may be changed.

10. In a flying shear, three shafts, one above another and generally parallel, cutters on the two lower shafts, a crank on the uppermost shaft, a crank arm connected between the crank and the middle shaft carrying the upper cutter, a flexible connection at one end of the middle shaft, a source of power, gearing between the source of power and the two lower shafts, change-speed gearing between the source of power and the flexible connection to the middle shaft and auxiliary gearing on the two lower shafts at the opposite end from the driving connection and intermittently engaging when the cutters are cooperating for shearing action.

11. In a flying shear, three generally parallel shafts, one above another, cutters on the two lower shafts, a crank on the upper shaft, a crank arm extending between the crank and the shaft carrying the upper cutter and adapted to reciprocate the upper cutter as the upper cutter revolves, spring means urging the upper cutter toward its uppermost position and opposing the action of the crank in moving the upper cutter downwardly, a source of power, a flexible connection at one end of the middle shaft, gearing between the source of power and the two lower shafts driving the two lower shafts from said end, gearing between the two lower shafts at their opposite ends, meshing at the time of shearing action of the cutters and change-speed gearing between the source of power and the upper shaft at said end.

12. In a flying shear, a pair of cooperating revoluble cutters, a pair of generally parallel shafts, one revolubly supporting each cutter, a stationary bearing for one cutter shaft, a reciprocable bearing for the other cutter shaft, a cross head supporting the reciprocable bearing, cross head guides directing the reciprocation of the cross head, spring means urging the reciprocable bearing in one direction, an eccentric shaft generally parallel to the cutter shafts, an eccentric on the eccentric shaft, a pitman connecting the eccentric and the cross head, a flexible connection at one end of the reciprocable cutter shaft, and power means driving the stationary cutter shaft, the reciprocable cutter shaft through the flexible connection and the eccentric shaft from adjoining ends of the shafts.

EDWARD T. PETERSON.